(12) United States Patent
Quinlan et al.

(10) Patent No.: US 12,295,395 B2
(45) Date of Patent: May 13, 2025

(54) LIQUID CONCENTRATE COMPOSITION

(71) Applicant: Tate & Lyle Solutions USA LLC, Hoffman Estates, IL (US)

(72) Inventors: Mary Elizabeth Quinlan, London (GB); Sven Tiedemann, Lübeck (DE); Chun Jenny Siegfeld, Lübeck (DE)

(73) Assignee: Tate & Lyle Solutions USA LLC, Hoffman Estates, IL (US)

( * ) Notice: Subject to any disclaimer, the term of this patent is extended or adjusted under 35 U.S.C. 154(b) by 379 days.

(21) Appl. No.: 17/554,998

(22) Filed: Dec. 17, 2021

(65) Prior Publication Data

US 2022/0125085 A1    Apr. 28, 2022

Related U.S. Application Data

(63) Continuation of application No. PCT/GB2020/051481, filed on Jun. 18, 2020.

(30) Foreign Application Priority Data

Jun. 19, 2019 (GB) ...................................... 1908813

(51) Int. Cl.
  *A23L 27/30*  (2016.01)
  *A23L 2/385* (2006.01)
  (Continued)

(52) U.S. Cl.
  CPC ............... *A23L 27/36* (2016.08); *A23L 2/385* (2013.01); *A23L 2/44* (2013.01); *A23L 2/60* (2013.01); *A23L 2/68* (2013.01)

(58) Field of Classification Search
  CPC ... A23L 27/36; A23L 2/44; A23L 2/60; A23L 2/68; A23L 2/385
  See application file for complete search history.

(56) References Cited

U.S. PATENT DOCUMENTS 10,750,760 B2   8/2020  Woodall
10,905,146 B2   2/2021  Prakash et al.
(Continued)

FOREIGN PATENT DOCUMENTS

CN   107529774 A   1/2016
CN   105722533 A   6/2016
(Continued)

OTHER PUBLICATIONS

Japanese Patent Office Office Action for JP Pat. Appl. No. 2021-575526, and partial translation, dispatched Apr. 3, 2024, 17 pages.
(Continued)

*Primary Examiner* — Anthony J Weier
(74) *Attorney, Agent, or Firm* — Matney Legal Group PLLC (57) ABSTRACT

Provided herein is a liquid concentrate composition having steviol glycosides, a stabiliser including xanthan and/or iota-carrageenan, and water. The steviol glycosides include rebaudioside M in an amount of about 800 ppm or more by total weight of the liquid concentrate composition. The pH of the liquid concentrate composition is less than about 7. Also provided herein is a method of providing a food product, a food product obtainable from the method, and a method of providing a liquid concentrate composition.

19 Claims, 2 Drawing Sheets

(51) Int. Cl.
*A23L 2/44* (2006.01)
*A23L 2/60* (2006.01)
*A23L 2/68* (2006.01)

(56) References Cited

U.S. PATENT DOCUMENTS

| | | | |
|---|---|---|---|
| 2014/0099403 A1* | 4/2014 | Prakash | C07H 1/08 426/71 |
| 2014/0342043 A1* | 11/2014 | Bell | A23L 2/60 426/72 |
| 2015/0017284 A1* | 1/2015 | Prakash | A23L 2/60 426/654 |
| 2015/0086695 A1* | 3/2015 | Oglesby | A23L 27/80 426/548 |
| 2016/0309761 A1 | 10/2016 | Brower, III et al. | |
| 2017/0119032 A1* | 5/2017 | Patron | A23L 27/204 |
| 2019/0133170 A1 | 5/2019 | Brijwani et al. | |
| 2019/0223481 A1* | 7/2019 | Gaspard | A23L 2/68 |
| 2020/0163874 A1* | 5/2020 | Chen | A61K 9/006 |
| 2022/0162250 A1* | 5/2022 | Gaspard | A23L 27/36 |
| 2022/0256900 A1* | 8/2022 | Sundaresan | A23L 27/30 |
| 2023/0127708 A1* | 4/2023 | Gaspard | A23L 2/54 426/477 |

FOREIGN PATENT DOCUMENTS

| | | |
|---|---|---|
| JP | 2016518143 A | 6/2016 |
| WO | 2013148177 A1 | 10/2013 |
| WO | 2014186084 A1 | 11/2014 |
| WO | 2015006764 A1 | 1/2015 |
| WO | 2016139470 A1 | 9/2016 |
| WO | 2019071182 A1 | 4/2019 |
| WO | 2019071188 A1 | 4/2019 |

OTHER PUBLICATIONS

Chinese Office Action for Chinese Application No. 202080044753.6, dated May 19, 2023 with partial translation, 13 pages.
International Search Report and Written Opinion dated Nov. 2, 2020 for PCT Application No. PCT/GB2020/051481.
GB Search Report dated Nov. 18, 2019 for GB Application No. GB1908813.7.
Korean Notice of Non-Final Rejection for Application No. KR 1020227000054 with copies of references cited therein, mailed Mar. 10, 2025, 145 pages.
Partial English Translation of Korean Notice of Non-Final Rejection for Application No. KR 1020227000054, mailed Mar. 10, 2025, 5 pages.

* cited by examiner

LIQUID CONCENTRATE COMPOSITION

CROSS-REFERENCE TO RELATED APPLICATIONS

This application is a continuation of International Application No. PCT/GB2020/051481, filed Jun. 18, 2020, which claims priority to GB Application No. 1908813.7, filed Jun. 19, 2019, under 35 U.S.C. § 119(a). Each of the above-referenced patent applications is incorporated by reference in its entirety.

BACKGROUND

Technical Field

The present invention relates to a liquid concentrate composition comprising steviol glycosides and methods of preparing them. Also described herein are beverages and methods of preparing beverages.

Background

Sugars, such as sucrose, fructose and glucose, provide a pleasant taste to beverages, foods, pharmaceuticals, and oral hygiene/cosmetic products. Sucrose, in particular, imparts a taste that is preferred by certain consumers. Despite its superior taste profile and sweetness characteristics, sucrose is caloric. Therefore, non-caloric or lower caloric sweeteners are desirable. However, lower caloric natural and synthetic sweeteners often possess flavour profiles that are not as desirable to certain consumers as sugars.

Steviol glycosides are natural sweetening compounds obtainable from the plant *Stevia rebaudiana*. These compounds are glycosides of the diterpene derivative steviol (ent-13-hydroxykaur-16-en-19-oic acid), and have been identified as non-caloric alternatives to sugar having a desirable flavour profile. Traditionally, on a dry weight basis, the four major steviol glycosides found in the leaves of *Stevia* are dulcoside A (~0.3%), rebaudioside C (~0.6-1.0%), rebaudioside A (~3.8%) and stevioside (9.1%); the ratio of steviol glycosides may vary considerably depending on the plant strain. Other glycosides identified in *Stevia* include rebaudioside B, rebaudioside D, rebaudioside E, rebaudioside F, rebaudioside G, rebaudioside H, rebaudioside I, rebaudioside J, rebaudioside K, rebaudioside L, rebaudioside M, rebaudioside N, rebaudioside O, steviolbioside and rubusoside. Rebaudioside M (sometimes referred to as rebaudioside X) and rebaudioside D have been identified as having particularly desirable taste profiles.

Some applications require sweeteners to be delivered in high concentrations within a liquid concentrate. However, it may be difficult to include rebaudiosides at the desired concentration because of their low solubility in water. For example, rebaudioside M has a solubility of about 1,400 ppm in water having a pH of approximately 7; in acidic conditions, rebaudioside M has an even lower solubility. This may present a particular barrier for use in beverages or beverage concentrates (sometimes called "syrups"), which often have a pH of less than 7.

Thus, it is desirable for stable systems to be developed where rebaudiosides may be provided in high concentrations under acidic conditions.

SUMMARY

According to a first aspect of the present invention, there is provided a liquid concentrate composition comprising:
   steviol glycosides, wherein the steviol glycosides include rebaudioside M in an amount of about 800 ppm or more by total weight of the liquid concentrate composition;
   a stabiliser comprising xanthan and/or iota-carrageenan; and
   water;
   wherein the pH of the liquid concentrate composition is less than about 7.

In some embodiments, the pH of the liquid concentrate composition is less than about 5.

In some embodiments, the steviol glycosides are present in an amount of about 1000 ppm or more by total weight of the liquid concentrate composition. In particular embodiments, the liquid concentrate composition comprises steviol glycosides in an amount of from about 2,000 to about 5,000 ppm by weight of the liquid concentrate composition.

In some embodiments, the steviol glycosides include rebaudioside M in an amount of at least about 50% by weight of the steviol glycosides. In particular embodiments, the steviol glycosides include rebaudioside M in an amount of at least about 95% by weight of the steviol glycosides.

In some embodiments, the liquid concentrate composition comprises rebaudioside M in an amount of from about 2,000 ppm to about 5,000 ppm by total weight of the liquid concentrate composition.

The liquid concentrate composition may be a stable suspension at a temperature of less than about 45° C.

In some embodiments, the stabiliser is present in the liquid concentrate composition in an amount of from about 0.01 to about 2.0% by total weight of the liquid concentrate composition. In particular embodiments, the stabiliser is present in an amount of from about 0.095% to about 0.3%.

In some embodiments, the stabiliser comprises xanthan which is present in the liquid concentrate composition in an amount of from about 0.01 to about 1.0% by total weight of the liquid concentrate composition. In particular embodiments, the xanthan is present in an amount of from about 0.095% to about 0.25%.

In some embodiments, the stabiliser comprises iota-carrageenan which is present in the liquid concentrate composition in an amount of from about 0.05 to about 1.0% by total weight. In particular embodiments, the iota-carrageenan is present in an amount of from about 0.2% to about 0.35%.

In some embodiments the liquid concentrate composition is a beverage base.

According to another aspect of the present invention there is provided a method of providing a food product, the method comprising:
   diluting a liquid concentrate composition as described above with water to provide the food product, wherein rebaudioside M is present in the food product in an amount of about 800 ppm or less by weight of the food product.

In some embodiments 1 part liquid concentrate composition is diluted with 4 to 7 parts water to provide a food product, wherein the food product is a beverage. In particular embodiments, the composition is diluted with 5 parts water.

According to another aspect of the present invention, there is provided a food product obtainable by the method described hereinabove. In a particular embodiment there is provided a beverage obtainable from the method described hereinabove.

According to another aspect of the present invention there is provided a kit comprising:
- a stabiliser comprising xanthan and/or iota-carrageenan;
- steviol glycosides, wherein the steviol glycosides include rebaudioside M; and
- instructions to combine the stabiliser and steviol glycosides with water to provide a liquid concentrate composition as described hereinabove.

According to another aspect of the present invention there is provided a method of providing a liquid concentrate composition, the method comprising:
- combining a stabiliser that comprises xanthan and/or iota-carrageenan, steviol glycosides, and water, to provide the liquid concentrate composition, wherein the steviol glycosides are present in the liquid concentrate composition in an amount of about 800 ppm or more, wherein the liquid concentrate composition has a pH less than about 7, and wherein the combining is carried out at a temperature of about 45° C. or less.

In some embodiments, the method of providing a liquid concentrate excludes any step which includes heating the mixture to a temperature greater than about 45° C.

Further features and advantages of the invention will become apparent from the following description of preferred embodiments of the invention, given by way of example only, which is made with reference to the accompanying drawings.

DETAILED DESCRIPTION

In one embodiment of the present invention, there is provided a liquid concentrate composition comprising steviol glycosides, wherein the steviol glycosides comprise rebaudioside M in an amount of 800 ppm or more, a stabiliser comprising xanthan and/or iota-carrageenan, and water, wherein the pH of the liquid concentrate composition is about 7 or less.

As used herein, the term "liquid concentrate composition" refers to a composition having a high sweetening capacity which may be used to prepare sweetened food products, such as beverages. In some embodiments, the liquid concentrate composition is a beverage base, in that the liquid concentrate composition is one to which only water need be added to make a finished beverage product.

The inventors have found that, surprisingly, liquid concentrate compositions according to the present invention may allow for the stabilisation of steviol glycosides at high concentrations in acidic aqueous systems. In some cases, the methods of providing these liquid concentrate compositions do not require other processing steps, such as heating or spray drying, for example. This in turn may also reduce manufacturing costs.

The liquid concentrate compositions of the present invention are aqueous solutions comprising steviol glycosides.

As used herein, the term "steviol glycosides" may refer to a mixture of steviol glycosides, or a composition consisting of a single steviol glycoside. Each steviol glycoside may be any glycoside of the diterpene compound, steviol.

Steviol glycosides are typically about 150 to 450 times sweeter than sugar, and can be extracted from the *Stevia* plant using methods known in the art. A crude *stevia* extract typically comprises stevioside, steviolbioside, and several rebaudiosides, including rebaudioside A, rebaudioside B, rebaudioside C, rebaudioside D, rebaudioside E, rebaudioside F, rebaudioside G, rebaudioside H, rebaudioside I, rebaudioside J, rebaudioside K, rebaudioside L, rebaudioside M, rebaudioside N, rebaudioside O (sometimes referred to herein as "Reb" rather than "rebaudioside"). Alternatively, rebaudiosides may be prepared by bioconversion or fermentatively. Reb M in particular may have more desirable taste characteristics over other steviol glycosides.

The steviol glycosides may be provided in powder form before added to the liquid concentrate composition. In some cases, the steviol glycoside component may contain other minor impurities associated with the extraction or purification of the steviol glycosides, or from the bioconversion production thereof.

Steviol glycosides are present in the liquid concentrate composition in an amount of about 800 ppm or more by weight of the liquid concentrate composition. In some embodiments, the steviol glycosides are present in an amount of about 1000 ppm or more, 2000 ppm or more, 3000 ppm or more, suitably about 2500 ppm or more by total weight of the liquid concentrate composition. In some embodiments, the liquid concentrate composition comprises steviol glycosides in an amount of about 20,000 ppm or less, 15,000 ppm or less, 10,000 ppm or less, 8,000 ppm or less, by total weight of the liquid concentrate composition. In particular embodiments, the liquid concentrate composition comprises steviol glycosides in an amount of from about 2,000 to about 5,000 ppm by weight of the liquid concentrate composition.

The liquid concentrate composition includes rebaudioside M in an amount of about 800 ppm or more. In some embodiments, the liquid concentrate composition includes rebaudioside M in an amount of 1000 ppm or more, 2000 ppm or more, 3000 ppm or more, suitably about 2500 ppm or more by total weight of the liquid concentrate composition. In some embodiments, the liquid concentrate composition includes rebaudioside M in an amount of about 20,000 ppm or less, 15,000 ppm or less, 10,000 ppm or less, 8,000 ppm or less, suitably 6,000 ppm or less, by total weight of the liquid concentrate composition. In a particular embodiment, the liquid concentrate composition includes rebaudioside M in an amount of from about 2,000 ppm to about 5,000 ppm by total weight of the liquid concentrate composition.

The liquid concentrate compositions according to embodiments of the present invention which have such high rebaudioside M contents may have a sufficiently high sweetening capability such that once it has been diluted to provide a beverage product, the beverage product having rebaudioside M in an amount suitable for providing a desirable taste profile.

In some embodiments, the steviol glycosides of the liquid concentrate composition include rebaudioside M in an amount of about 30% or more, 50% or more, 80% or more, 90% or more, 95% or more, 98% or more, by weight of the steviol glycosides present in the liquid concentrate composition. In a particular embodiment, the steviol glycosides of the liquid concentrate composition include rebaudioside M in an amount of about 95% or more by weight of the steviol glycosides.

In some embodiments, the liquid concentrate composition may further comprise additional sweeteners, flavourants, functional ingredients and/or additives.

The additional sweetener can be any type of sweetener, for example, a natural, non-natural, or synthetic sweetener. In at least one embodiment, the at least one additional sweetener is chosen from natural sweeteners other than Stevia sweeteners. In another embodiment, the at least one additional sweetener is chosen from synthetic high potency sweeteners. For example, the at least one additional sweetener may be a carbohydrate sweetener. Non-limiting examples of suitable carbohydrate sweeteners include sucrose, fructose, glucose, erythritol, maltitol, lactitol, sorbitol, mannitol, xylitol, D-psicose, D-tagatose, leucrose, trehalose, galactose, rhamnose, cyclodextrin (e.g., a-cyclodextrin, b-cyclodextrin, and g-cyclodextrin), ribulose, threose, arabinose, xylose, lyxose, allose, altrose, mannose, idose, lactose, maltose, invert sugar, isotrehalose, neotrehalose, palatinose or isomaltulose, erythrose, deoxyribose, gulose, idose, talose, erythrulose, xylulose, psicose, turanose, allose, cellobiose, glucosamine, mannosamine, fucose, fuculose, glucuronic acid, gluconic acid, glucono-lactone, abequose, galactosamine, xylo-oligosaccharides (xylotriose, xylobiose and the like), gentiooligoscaccharides (gentiobiose, gentiotriose, gentiotetraose and the like), galactooligosaccharides, sorbose, ketotriose (dehydroxyacetone), aldotriose (glyceraldehyde), nigerooligosaccharides, fructooligosaccharides (kestose, nystose and the like), maltotetraose, maltotriol, tetrasaccharides, mannan-oligosaccharides, malto-oligosaccharides (maltotriose, maltotetraose, maltopentaose, maltohexaose, maltoheptaose and the like), dextrins, lactulose, melibiose, raffinose, rhamnose, ribose, isomerized liquid sugars such as high fructose corn/starch syrup (HFCS/HFSS) (e.g., HFCS55, HFCS42, or HFCS90), coupling sugars, soybean oligosaccharides, glucose syrup and combinations thereof.

In other embodiments, the additional sweetener is a carbohydrate sweetener selected from the group consisting of glucose, fructose, sucrose, D-psicose and combinations thereof.

In some embodiments, the liquid concentrate composition does not comprise a carbohydrate sweetener.

In yet other embodiments, the at least one additional sweetener is a synthetic sweetener. As used herein, the phrase "synthetic sweetener" refers to any composition which is not found naturally in nature and characteristically has a sweetness potency greater than sucrose, fructose, or glucose, yet has less calories. Non-limiting examples of synthetic high-potency sweeteners suitable for embodiments of this disclosure include sucralose, potassium acesulfame, acesulfame acid and salts thereof, aspartame, alitame, saccharin and salts thereof, neohesperidin dihydrochalcone, cyclamate, cyclamic acid and salts thereof, neotame, advantame, glucosylated steviol glycosides (GSGs) and combinations thereof. In still other embodiments, the additional sweetener can be a natural high potency sweetener. Suitable natural high potency sweeteners include mogroside IV, mogroside V, mogroside VI, iso-mogroside V, grosmomoside, neomogroside, Luo Han Guo sweetener, siamenoside, monatin and its salts (monatin SS, RR, RS, SR), curculin, glycyrrhizic acid and its salts, thaumatin, monellin, mabinlin, brazzein, hernandulcin, phyllodulcin, glycyphyllin, phloridzin, trilobatin, baiyunoside, osladin, polypodoside A, pterocaryoside A, pterocaryoside B, mukurozioside, phlomisoside I, periandrin I, abrusoside A, steviolbioside and cyclocarioside I.

In some embodiments, the liquid concentrate composition does not comprise a synthetic sweetener.

For example, any suitable flavourants may be included, including but not limited to, cola flavourants, diet cola flavourants, citrus flavourants such as orange flavourants (e.g. for orangeade) or lemon flavourants (e.g. for lemonade), juice cocktail flavourants, root beer flavourants, birch beer flavourants, fruit juice flavourants, tonic water flavourants, sport drink flavourants, and club soda flavourants.

For example, any functional ingredient may be included and may provide a real or perceived health benefit to the composition. Suitable functional ingredients include, but are not limited to, antioxidants, dietary fiber sources, fatty acids, vitamins, glucosamine, minerals, preservatives, hydration agents, probiotics, prebiotics, weight management agents, osteoporosis management agents, phytoestrogens, long chain primary aliphatic saturated alcohols, phytosterols and any combinations of the foregoing.

For example, any suitable additives may be included in the liquid concentrate composition, including but not limited to, pH-adjusting agents, carbohydrates, polyols, amino acids and their corresponding salts, poly-amino acids and their corresponding salts, sugar acids and their corresponding salts, nucleotides, organic acids, inorganic acids, organic salts including organic acid salts and organic base salts, inorganic salts, caffeine, astringent compounds, proteins or protein hydrolysates, surfactants, emulsifiers, weighing agents, juice, dairy, cereal and other plant extracts, flavonoids, alcohols, polymers and any combinations of the foregoing.

The liquid concentrate compositions as described herein comprise a stabiliser. The present inventors have identified that many stabilisers known in the art are not effective in stabilising a liquid concentrate composition having a pH of less than about 7. However, the present inventors have found that xanthan and/or iota-carrageenan may provide a stabilising effect in acidic steviol glycoside concentrate compositions.

The presence of a stabiliser has the effect of providing a more stable suspension of steviol glycosides at high steviol glycoside concentrations. The composition according to the present disclosure may remain a stable suspension for longer periods, such as 3 days or more. This may advantageously allow for easier storage of sweetener compositions before preparing ready-to-use beverages.

The amount of stabiliser in the composition will be dependent on the amount of liquid matrix (e.g. carbonated or non-carbonated water). In some cases, the stabiliser is present in the liquid concentrate composition in an amount of from about 2.0% or less, 1.5% or less, 1.0% or less, 0.7% or less, 0.5% or less, 0.4% or less, suitably 0.35% or less by weight of the liquid concentrate composition.

In some cases, the stabiliser is present in the liquid concentrate composition in an amount of from about 0.005% or more, 0.01% or more, 0.05% or more, 0.08% or more, 0.09% or more, suitably 0.095% or more by weight of the liquid concentrate composition.

In some cases, the stabiliser is present in the liquid concentrate composition in an amount of from about 0.095 to about 0.35% by weight of the liquid concentrate composition.

In some cases, the stabiliser comprises xanthan. In some cases, the stabiliser comprises xanthan and does not comprise iota-carrageenan. In some cases, the stabiliser consists of xanthan.

Any suitable type of compatible xanthan gum may be used. The presence of xanthan may increase the viscosity of the composition compared to a composition that does not comprises xanthan, but the inventors have identified that compositions comprising xanthan are highly pseudoplastic (i.e. shear thinning), and are thus easier to mix despite the increase in viscosity. The amount of xanthan present in the composition may be dependent on the amount of liquid matrix that is present.

In some cases, xanthan is present in an amount of from about 1.0% or less, 0.7% or less, 0.5% or less, 0.45% or less, 0.4% or less, suitably 0.3% or less, suitably 0.25% or less by weight of the liquid concentrate composition.

In some cases, xanthan is present in an amount of from about 0.01% or more, 0.05% or more, 0.07% or more, 0.090% or more, suitably 0.095% or more, by weight of the liquid concentrate composition. Suitably, xanthan is present in an amount of from about 0.095 to about 0.25% by weight of the liquid concentrate composition.

Without wishing to be bound by theory, it is thought that the addition of xanthan increases viscosity such that it provides a polymer network. The polymer network may prevent the steviol glycoside particles from exhibiting sedimentation, thereby providing a stable suspension of steviol glycoside particles throughout the liquid matrix. That is, the concentration at which the steviol glycosides are present and the liquid concentrate composition remains a stable suspension may be higher than a composition that does not contain xanthan. This effect may still be observed even in colder (temperatures less than 45° C.), acidic (pH less than 7) conditions, and without the need to apply any heat of the composition.

In some cases, the stabiliser comprises iota-carrageenan. In some cases, the stabiliser comprises iota-carrageenan and does not comprise xanthan. In some cases, the stabiliser consists of iota-carrageenan.

Carrageenan are categorized according to chemical structure which are named as mu-, kappa-, nu-, iota-, lambda-, theta-, and xi-carrageenan depending on their sulfate and anhydro-D-galactose contents. Common types of carrageenan in the market are kappa-, iota- and lambda-. Carrageenan types vary in characteristics depending on the cations present.

The carrageenan employed in some embodiments of the present invention is iota-carrageenan. Iota-carrageenan provides a thixotropic dispersion (undergoes time-dependent shear thinning) in cold water in solutions of calcium ions ("tap water" commonly contains calcium ions). Compositions comprising iota-carrageenan may therefore be easier to mix, as they will have the effect of remaining viscous whilst static, but decrease viscosity under shear strain. Iota-carrageenan gels most strongly with calcium, in which the gels formed are elastic and do not exhibit syneresis (the expulsion of liquid from the gel). The gels formed may provide a cross-linked network structure within the solution. Iota-carrageenan may be employed at cold temperatures (e.g. less than 45° C.), whereas kappa-carrageenans is not suitable for use at colder temperatures because of low solubility; lambda-carrageenans do not provide thixotropic dispersions or polymer networks in the presence of metal ions.

The amount of iota-carrageenan present in the composition may be dependent on the amount of liquid matrix that is present. In some cases, the iota-carrageenan is present in an amount of about 1.0% or less, 0.8% or less, 0.6% or less, 0.5% or less, 0.4% or less, suitably 0.35% or less, by weight of the liquid concentrate composition.

In some cases, the iota-carrageenan is present in an amount of about 0.01% or more, 0.05% or more, 0.08% or more, 0.1% or more, 0.12% or more, 0.14% or more, 0.16% or more, 0.18% or more, suitably 0.2% or more, by weight of the liquid concentrate composition. Suitably, the iota-carrageenan is present in an amount of from about 0.2 to about 0.35% by weight of the liquid concentrate composition.

Without wishing to be bound by theory, it is thought that the addition of iota-carrageenan causes the formation of a gel in the composition that provides a crosslinked network structure, allowing for the separation of steviol glycoside particles in solution. That is, the gel allows for a stable suspension of steviol glycoside particles within the composition. In this way, the concentration at which the steviol glycosides are present and the liquid concentrate composition remains a stable suspension may be higher than a composition that does not contain iota-carrageenan. This effect may still be observed even in colder (temperatures less than 45° C.), acidic (pH less than 7) conditions, and without the need to apply any heat of the composition.

In some cases, the stabiliser comprises xanthan and iota-carrageenan. In some cases, the stabiliser consists of xanthan and iota-carrageenan.

The viscosity of the liquid concentrate composition may depend upon the components present. In particular, the viscosity may depend on the amounts of xanthan and/or iota-carrageenan present. In some cases, the viscosity of the liquid concentrate composition is about 1 mPa or more, or 5 mPa or more, or 10 mPa or more (as measured on an Antan Paar Physica MCR 301 rheometer).

In some embodiments, the water contains calcium ions. In some embodiments, wherein the compositions described herein comprise a stabiliser comprising iota-carrageenan, the calcium ions assist in the formation of a gel.

According to some embodiments described herein, the liquid concentrate composition comprises a food-compatible sequestering agent. Any suitable food-compatible sequestering agent may be used, including but not limited to, trisodium citrate, sodiumhexametaphosphate, sodium acid pyrophosphate, trisodium phosphate, tetrasodium pyrophosphate, sodium tripolyphosphate, disodium phosphate, ethylenediamine tetraacetic acid disodium salt, including corresponding conjugate acids, potassium salts, and any combinations of the foregoing. In some cases, the food-compatible sequestering agent comprises trisodium citrate. In some cases, the food-compatible sequestering agent consists of trisodium citrate.

The amount of food-compatible sequestering agent present in the liquid concentrate composition may be selected according to the amount of metal ions present in the water (the "water hardness"). For example, water that comprises higher amounts of calcium (such as "hard water") may include a higher concentration of sequestering agent, particularly when the stabiliser comprises iota-carrageenan. The food-compatible sequestering agent may reduce the availability of free metal ions (if present) in the aqueous solution. Without wishing to be bound by theory, it is thought that this may control the degree of gel formation in the liquid concentrate composition, particularly where the stabiliser comprises iota-carrageenan.

In some cases, the food-compatible sequestering agent is present in the liquid concentrate composition in an amount of about 2.0% or less, 1.5% or less, 1.0% or less, 0.7% or less, 0.5% or less, 0.3% or less, suitably 0.2% or less, suitably 0.15% or less by weight of the liquid concentrate composition. In some cases, the food-compatible sequestering agent is present in the liquid concentrate composition in an amount of about 0.01% or more, 0.03% or more, 0.05% or more, suitably 0.07% or more, by weight of the liquid concentrate composition.

In some cases, the food-compatible sequestering agent is present in the liquid concentrate composition in an amount of from about 0.07 to about 0.15% by weight of the liquid concentrate composition.

The liquid concentrate compositions disclosed herein is acidic, and has a pH of about 7 or less, 5 or less, 4 or less, suitably 3 or less. In some cases, the pH of the liquid concentrate composition may be about 0.1 or more, 0.5 or more, 1 or more, 1.5 or more, suitably 2 or more.

In some cases, the pH of the liquid concentrate composition may be about from 0 to 7, from 0.5 to 6, from 1 to 5, from 1.5 to 4, suitably from 2 to 3.5.

The liquid concentrate composition may comprise a food-compatible acid. Any suitable food-compatible acid may be used, including but not limited to, citric acid, phosphoric acid, malic acid, ascorbic acid, benzoic acid, lactic acid, fumaric acid, adipic acid, tartaric acid, gluconic acid, succinic acid, maleic acid, cinnamic acid, glutaric acid, or carbonic acid, and any combinations of the foregoing. In some cases, the food-compatible acid comprises citric acid. In other cases, the food-compatible acid consists of citric acid.

In some cases, the food-compatible acid is present in the liquid concentrate composition in an amount of about 2.5% or less, 2% or less, 1.5% or less, 1% or less, suitably 0.8% or less, by weight of the liquid concentrate composition. In some cases, the food-compatible acid is present in the liquid concentrate composition in an amount of about 0.01% or more, 0.05% or more, 0.1% or more, 0.2% or more, 0.3% or more, suitably 0.4% or more, by weight of the liquid concentrate composition.

In some cases, the food-compatible acid is present in the liquid concentrate composition in an amount of from about 0.4 to about 0.8% by weight of the liquid concentrate composition.

In some cases, the amount of food-compatible acid present in the liquid concentrate composition will be selected as such to provide a composition with a pH in the ranges described hereinabove.

The liquid concentrate compositions according to the embodiments described herein may provide a stable suspension at a temperature of less than about 45° C.

In some cases, this stable suspension may be maintained for extended periods on standing.

Standard methods for characterisation of the dispersion stability of samples is given in the ISO standard TR 13097. One parameter that may be obtained by the methods of this standard, that is particularly suitable for measuring the dispersion stability of concentrated solutions, is the global Turbiscan Stability Index (TSI). Global TSI indicates the turbidity of a sample and is typically measured using Static Multiple Light Scattering (SMLS) on a Turbiscan apparatus (such as Turbiscan LAB, Turbiscan TOWER and Turbiscan AGS).

During measurement the turbidity profile of an emulsion is scanned across a length of a sample. The reading head of the measurement device is composed of a near infrared light source ($\lambda$=880 nm) and two synchronous detectors. A transmission detector receives the light, which passes through the sample (T), while a back-scattering detector receives the light back-scattered by the sample (BS). Since the transmission and back-scattering of light from the sample is measured every 20 µm, a detailed profile across the length of the sample is captured. By repeating the scan of a sample at different time (t) intervals, the migration of dispersed particles in a liquid system can be monitored.

The global Turbiscan Stability Index (TSI) sums all the variations detected across the length of the sample and provides a single parameter, that allows the physical stability of various samples to be compared.

The TSI of a sample is calculated using the following formula:

$$TSI = \sum_i \frac{\sum_h |scan_i(h) - scan_{i-1}(h)|}{H}$$

Where h is the selected position across the length of the sample; and H is the total length across the sample.

In some cases, a liquid concentrate composition according to some embodiments described herein has a global Turbiscan Stability Index (TSI) of about 10 or less, 5 or less, 8 or less, 6 or less, 5 or less, 4 or less, 3 or less, 2 or less, suitably 1.5 or less, after standing for 17 hours.

In some cases, a liquid concentrate composition according to some embodiments described herein has a global Turbiscan Stability Index (TSI) of about 15 or less, 12 or less, 10 or less, 9 or less, 8 or less, suitably 7 or less, after standing for 72 hours. In some examples, the liquid concentrate composition may exhibit this turbidity level after standing for 90 hours.

Another aspect of the present invention is a method of preparing a liquid concentrate composition. The method comprises combining a stabiliser as described hereinabove with steviol glycosides and water such that the steviol glycosides are present in the liquid concentrate composition in an amount of about 800 ppm or more and has a pH of less than about 7.

In some examples, the components are combined such that the liquid concentrate composition has a steviol glycoside concentration as described hereinabove. In particular embodiments, the steviol glycosides comprise rebaudioside M, and the components are combined such that the liquid concentrate composition has a rebaudioside M concentration as described hereinabove.

In some examples, the liquid concentrate composition has a pH as described hereinabove.

The components of the liquid concentrate composition are combined at a temperature of about 45° C. or less. For example, the components may be combined at a temperature of less than 30° C. In some embodiments, the components are combined at ambient temperature. Surprisingly, the present inventors have identified that stable liquid concentrate compositions comprising a xanthan and/or iota-carrageenan stabiliser can be prepared at relatively low temperatures.

In some embodiments, the method of providing a liquid concentrate excludes any step which includes heating the mixture to a temperature greater than about 45° C. In particular, these embodiments may include preparing a liquid concentrate composition without a step of heating the components to a temperature of greater than about 45° C., wherein the liquid concentrate composition has a global Turbiscan Stability Index of about 5 or less after standing for 17 hours, and/or a global Turbiscan Stability Index of about 15 or less after standing for 72 hours.

This may advantageously allow for preparation of stable liquid concentrate compositions, such as beverage concentrates, without requiring machinery for heating or requiring energy-intensive heating steps. The present method of preparing a liquid concentrate composition may therefore be more economic and energy-efficient.

In another aspect of the present invention there is provided a kit for preparing a liquid concentrate composition as described hereinabove. The kit includes a stabiliser comprising xanthan and/or iota-carrageenan. The kit also includes steviol glycosides, wherein the steviol glycosides include rebaudioside M. The kit further includes instructions to combine the stabiliser and steviol glycosides with water to provide a liquid concentrate composition as described hereinabove.

The liquid concentrate composition may be used to prepare a food product. In some cases, the liquid concentrate composition is a beverage concentrate; the food product which the liquid concentrate composition is used to prepare may be a beverage. Beverage concentrates or beverage syrups (sometimes called "throw syrups") are used to prepare ready-to-drink beverages by mixing the beverage concentrate or syrup with a predetermined volume of liquid (e.g. still or carbonated water) and optional further components. In particular embodiments, the liquid concentrate composition is a beverage base, wherein ready-to-drink beverages are prepared by mixing the beverage base with a predetermined volume of water (e.g. still or carbonated water) without requiring the addition of any further components.

The beverage concentrate may be processed into a beverage product (sometimes called a "ready-to-drink beverage") by the consumer. Such beverage concentrates may be processed into a beverage product by addition of a liquid (e.g. still or carbonated water), and may be referred to as "pre-mix" products. Beverage concentrates may be concentrates for alcoholic drinks or soft drinks. Beverage concentrates for soft drinks may be for soft drinks that are cold drinks (including fruit flavoured soft drinks and supplement drinks such as high-energy or high-protein sports drinks) or hot drinks (e.g. tea, cocoa, hot chocolate, coffee).

In some embodiments, a method of preparing a ready-to-drink beverage product is provided wherein the liquid concentrate composition described herein is diluted with water to provide the beverage product, wherein rebaudioside M is present in the beverage product in an amount of about 800 ppm or less, 600 ppm or less, suitably 500 ppm or less, by weight of the food product. In some embodiments, rebaudioside M is present in the beverage product in an amount of about 10 ppm or more, 50 ppm or more, suitably 100 ppm or more, by weight of the beverage product. Suitably, rebaudioside M is present in the food product in an amount of from about 50 ppm to about 600 ppm by weight of the beverage product.

In some embodiments, 1 part liquid concentrate composition is diluted with 4 to 7 parts water to provide a ready-to-drink beverage product, suitably 5 to 6 parts, suitably 5 parts.

Non-limiting examples of a ready-to-drink beverage product that might be prepared from the beverage concentrate of the present invention include a carbonated beverage (including, but not limited to, soft carbonated beverages), a non-carbonated beverage (including, but not limited to, soft noncarbonated beverages such as flavoured waters and sweet tea or coffee based beverages), fruit-flavoured beverage, fruit-juice, tea, milk, coffee, especially those which are reduced sugar or low sugar products. Other types of beverage product not mentioned here but which conventionally include one or more nutritive sweetener may also be contemplated in the context of the present invention, especially those which are reduced sugar or low sugar products. Examples of non-carbonated and carbonated beverage products include cola, diet cola, soda, diet soda, citrus flavoured drinks such as orange flavoured drinks (e.g. orangeade) or lemon flavoured drinks (e.g. lemonade), juice cocktail, root beer, birch beer, any fountain drink, sparkling fruit juice, water, sparkling water, tonic water, sport drink, and club soda. Beverage products may also include non-alcoholic (soft) or alcoholic drinks such as any beer, including ale, pilsner, lager, or derivation thereof, malt liquor, red wine, white wine, sparkling wine, fortified wine, wine cooler, wine spritzer, any pre-made cocktail mixer including margarita mix, sour mix, or daiquiri mix, any fermented fruit or tea beverage, hard liquor, and any flavoured liqueur such as brandy, schnapps, bitters, or cordial. Beverage products may include any dairy, milk, or cream product or any dairy, cream, or milk substitute such as half & half, non-dairy creamer, powdered creamer, flavoured creamer, soymilk product, and lactose-free milk product. Beverage products may also include any fruit or vegetable juice in whole, concentrated, or powdered form and any combination of fruit and vegetable juices or other beverages. Beverage products may also include coffee, any coffee drink, any coffee flavouring syrup, tea, iced tea, and cocoa, as well as any combination of any of the foregoing.

Another aspect of the present invention is a food product obtainable from the method described hereinabove. For example, the food product may be a beverage obtainable from the method described hereinabove. In particular, embodiments of the present invention include ready-to-drink beverages listed hereinabove prepared by the method described hereinabove.

EXAMPLES

Example 1

Experiments were conducted to evaluate the dispersion stability characteristics of examples of liquid concentrate compositions. Table 1 shows a list of the compositions prepared.

Each sample was prepared by combining dry components including the stabiliser (if present), sequestrant (if present), steviol glycosides and citric acid, then combining the dry components with tap water, then vigorously mixing the components to provide homogenous solution.

In all samples, the steviol glycoside component contained >95% reb M, and were made up to 100% with tap water at 10° C.

The pH of each sample was measured using a standard pH meter.

Sample 1 is a control sample which comprises reb M but does not comprise a stabiliser; samples 2, 4, and 6 are examples of liquid concentrate compositions according to the present invention wherein the stabiliser comprises xanthan and/or iota-carrageenan; samples 3, 5, 7 and 8 are reference examples which employ alternative stabilisers.

TABLE 1

| Sample no. | Stabiliser composition | Stabiliser (% wt.) | Reb M (% wt.) | Citric acid (% wt.) | pH |
|---|---|---|---|---|---|
| 1 (control) | — | 0 | 0.4 | 0.6 | 2.54 |
| 2 | 73% Iota-carrageenan 27% TSC | 0.3 | 0.4 | 0.6 | 2.88 |

TABLE 1-continued

| Sample no. | Stabiliser composition | Stabiliser (% wt.) | Reb M (% wt.) | Citric acid (% wt.) | pH |
|---|---|---|---|---|---|
| 3 (reference) | LM Pectin | 0.6 | 0.4 | 0.6 | 2.53 |
| 4 | 92% Xanthan 8% Guar | 0.5 | 0.4 | 0.6 | 2.70 |
| 5 (reference) | Guar | 0.4 | 0.4 | 0.6 | 2.55 |
| 6 | Xanthan | 0.1 | 0.4 | 0.6 | 2.65 |
| 7 (reference) | 99.8% LA Gellan/ 0.1% LM Pectin 0.1% LBG | 0.035 | 0.4 | 0.6 | 2.48 |
| 8 (reference) | 99.8% LA Gellan 0.1% LM Pectin 0.1% LBG 0.08% TSC | 0.115 | 0.4 | 0.6 | 2.87 |

TSC = Trisodium citrate
LM Pectin = Low methoxyl pectin
LA Gellan = Low acyl gellan gum
LBG = Locust bean gum Samples 1 (no stabiliser), 3 (pectin stabiliser), 7 (gellan/pectin/locust bean stabiliser) and 8 (gellan/pectin/locust bean stabiliser with sequestering agent) exhibited visible sedimentation immediately. Samples 2 (iota-carrageenan stabiliser with sequestrant), 4 (xanthan/guar stabiliser), 5 (guar stabiliser) and 6 (xanthan stabiliser) formed stable suspensions.

Samples 1, 2, 5 and 6 were stored in a fridge for a total of 90 hours. The dispersion stability characteristics of 1, 2, 5 and 6 were evaluated by measuring the turbidity of each sample over time. In this way, the stability of the composition over extended periods of time can be determined.

Figure 1:
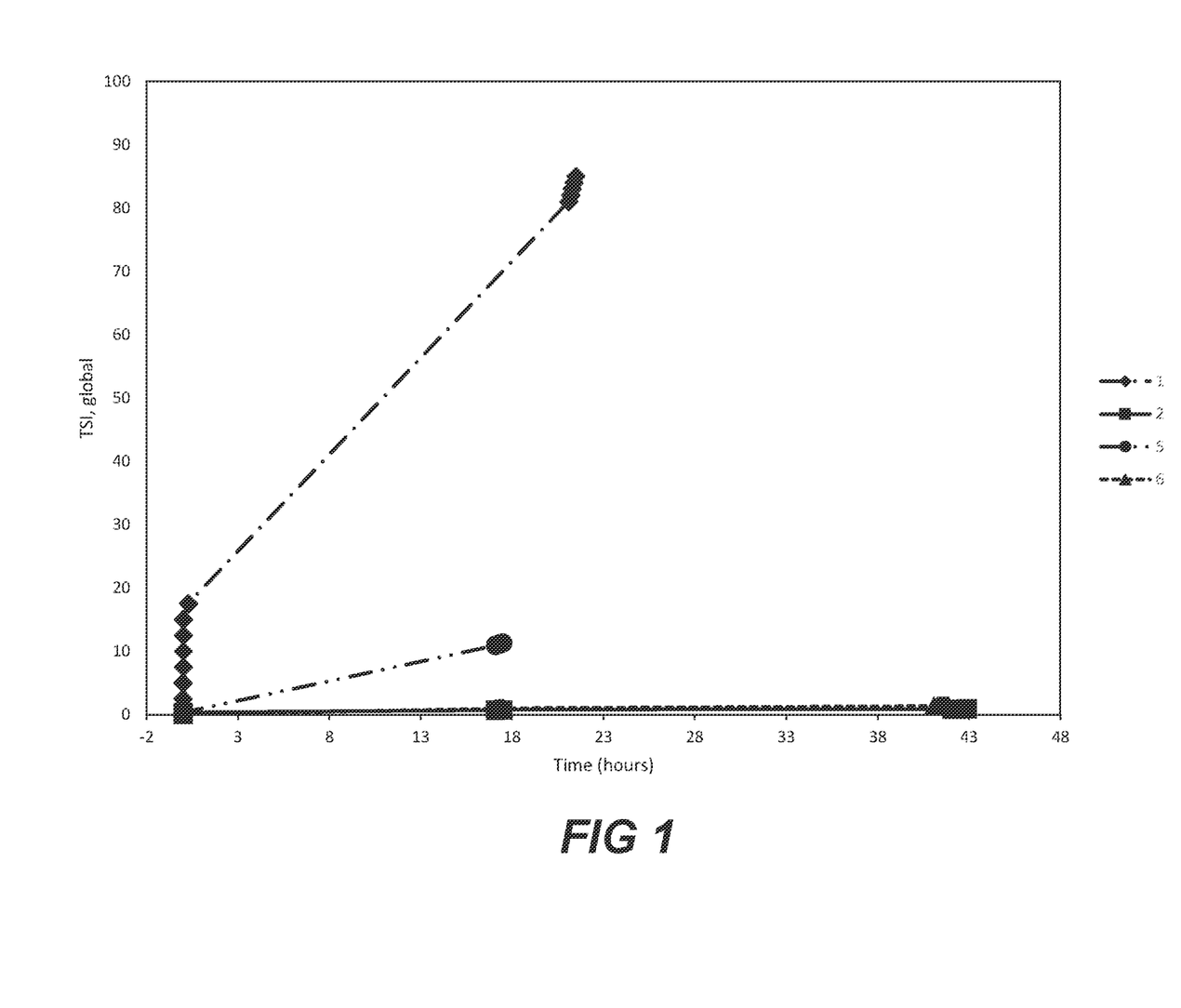
FIG. 1 is a graph showing the turbidity of liquid concentrate compositions according to some embodiments of the present invention compared with other liquid concentrate compositions.

Turbidity measurements were made using a Turbiscan TOWER apparatus to measure the Turbiscan Stability Index (TSI), a unitless measure of turbidity. Measurements were taken at a top position of each sample, a bottom position of each sample, as well as a global measurement across a length of the samples. The TSI is measured by Static Multiple Light Scattering (SMLS). A lower TSI indicates less back-scattering of light by the sample, thereby indicating a more stable suspension. Measurements were conducted in triplicate. The average results of the Turbidity measurements at each timepoint for samples 1, 2, 5 and 6 are shown in Table 2. FIG. 1 shows the turbidity measurements graphically; the numbers used in the legend of FIG. 1 correspond to the sample numbers given in Table 2.

TABLE 2

| | | T = 17 h 42 min | | | T = 90 hours | | |
|---|---|---|---|---|---|---|---|
| Sample no. | Temp (° C.) | TSI, global | TSI, bottom | TSI, top | TSI, global | TSI, bottom | TSI, top |
| 1 | 10 | 71.5 | 80.9 | 49.2 | NM | NM | NM |
| 2 | 10 | 0.8 | 0.5 | 1.1 | 1.0 | 0.7 | 1.3 |
| 5 | 10 | 11.4 | 15.8 | 11.4 | NM | NM | NM |
| 6 | 10 | 0.2 | 0.3 | 0.2 | 6.6 | 11.6 | 6.1 |

NM = not measured

Both samples 2 (carrageenan stabiliser) and 6 (xanthan stabiliser) showed no appreciable sedimentation after standing for 17 h 42 min, and for 90 hours. Sample 5 (guar stabiliser) exhibited visual sedimentation after 24 hours so no turbidity measurement was taken at T=90 hours.

It can be seen that, samples 2 and 6 showed the best dispersion characteristics, both having the most stable suspensions after 17 h 42 minutes, with a global TSI of less than 1.5.

Example 2

Further experiments were conducted by preparing liquid concentrate compositions according to embodiments of the present the invention. The amount of stabiliser in each sample was varied. Table 3 lists the compositions prepared as samples 9 to 12. Samples 9 to 12 were prepared in the same manner as samples 1 to 8.

TABLE 3

| Sample no. | Stabiliser composition | Stabiliser (% wt.) | Reb M (% wt.) | Citric acid (% wt.) | Measured pH |
|---|---|---|---|---|---|
| 1 (control) | — | 0 | 0.4 | 0.6 | 2.54 |
| 9 | 73% Iota-carrageenan 27% TSC | 0.35 | 0.4 | 0.6 | 2.88 |
| 10 | 73% Iota-carrageenan 27% TSC | 0.40 | 0.4 | 0.6 | 2.92 |
| 11 | Xanthan | 0.15 | 0.4 | 0.6 | 2.54 |
| 12 | Xanthan | 0.20 | 0.4 | 0.6 | 2.57 |

Figure 2:
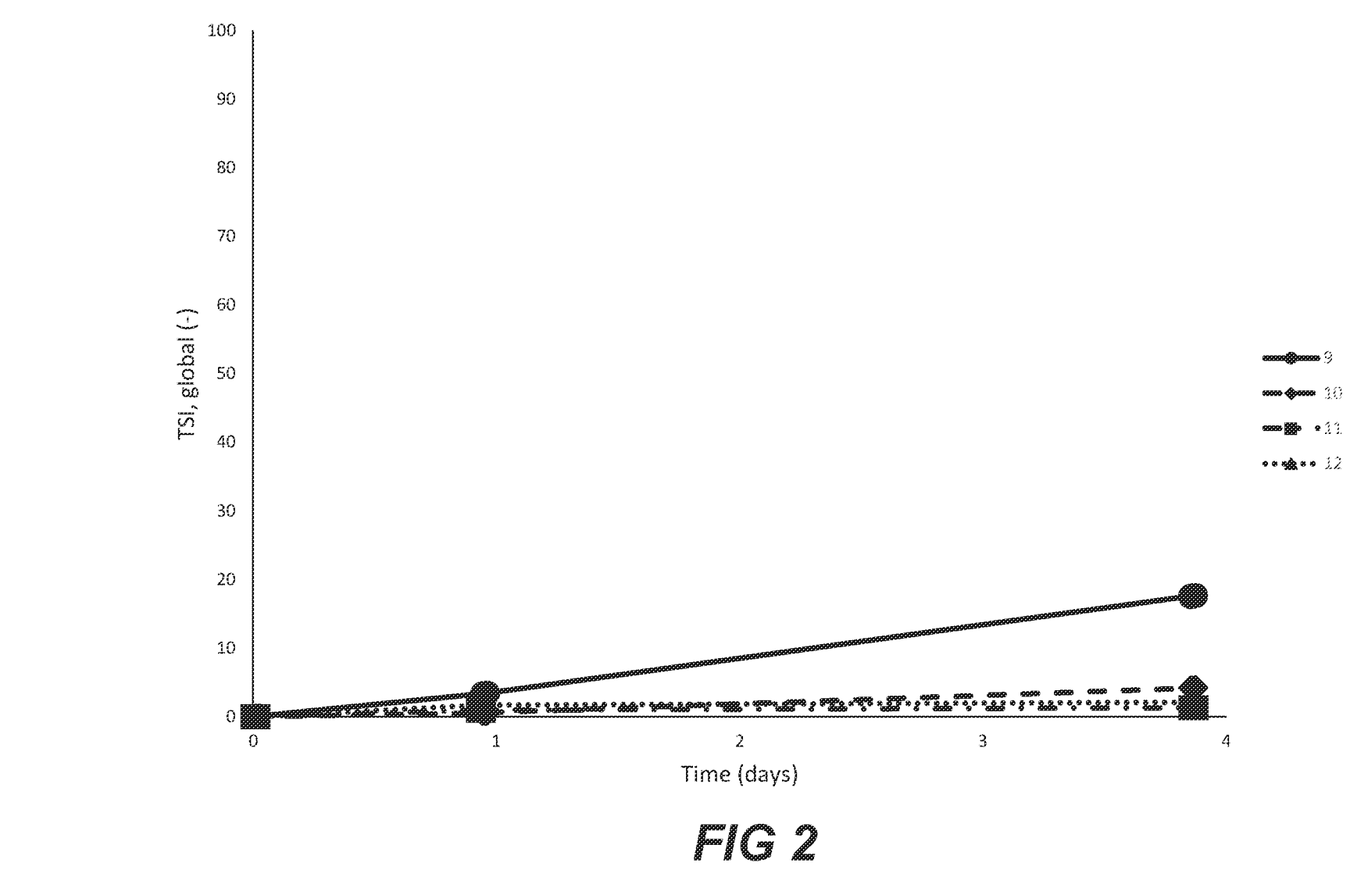
FIG. 2 is a graph showing the turbidity of liquid concentrate compositions according to some embodiments of the present invention.

The dispersion characteristics of samples 9 to 12 over time were determined in the same way as in Example 2. The Turbidity measurements measured using the Turbiscan TOWER apparatus, for samples 9-12, are shown in Table 4 and FIG. 2.

TABLE 4

| | | t = 96 hours | | |
|---|---|---|---|---|
| Sample no. | Temp (° C.) | TSI, global | TSI, bottom | TSI, top |
| 9 | 10 | 17.5 | 5.6 | 60.1 |
| 10 | 10 | 4.2 | 2.1 | 17.4 |
| 11 | 10 | 1.3 | 1.3 | 1.7 |
| 12 | 10 | 2.2 | 2.1 | 2.2 |

Each of samples 9 to 12 showed low global TSI measurements after standing for 4 days. Sample 11 showed the best dispersion characteristics, the solution remaining a stable suspension for 4 days without exhibiting any visible sedimentation and with the lowest turbidity values.

Example 3

Food product were prepared from liquid concentration composition samples 9 to 12. Ready-to-drink beverages were prepared by combining 1 part liquid concentrate composition with 5 parts carbonated water.

For each sample, 33.33 g of concentrate was combined with 166.67 g of carbonated water and stirred. The samples turned completely clear, and showed no sedimentation.

A comparative ready-to-drink beverage product having the same reb M and citric acid content but without stabiliser was prepared, and compared with the ready-to-drink beverage products prepared from samples 9 to 12. The comparative beverage product sample was visually indistinguishable from diluted samples 9 to 12.

Each of diluted samples 9 to 12 were tasted, and the taste compared with the taste of the comparative reb M ready-to-drink beverage. It was found that the taste of samples 9 to 12 was indistinguishable from the comparative reb M ready-to-drink beverage, showing that the stabiliser components present in samples 9 to 12 do not adversely affect the taste or sweetness.

The above embodiments are to be understood as illustrative examples of the invention. Further embodiments of the invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

What is claimed is:

1. A liquid concentrate composition comprising:
    steviol glycosides, wherein the steviol glycosides include rebaudioside M in an amount of about 800 ppm or more by total weight of the liquid concentrate composition;
    a stabiliser comprising xanthan and/or iota-carrageenan; and water;
    wherein the pH of the liquid concentrate composition is less than about 7.

2. The liquid concentrate composition of claim 1, wherein the pH of the liquid concentrate composition is less than about 5.

3. The liquid concentrate composition of claim 1, wherein the steviol glycosides are present in the liquid concentrate composition in an amount of about 1000 ppm or more by total weight of the liquid concentrate composition.

4. The liquid concentrate composition of claim 1, wherein the steviol glycosides include rebaudioside M in an amount of at least about 50% by weight of the steviol glycosides.

5. The liquid concentrate composition of claim 1, wherein the steviol glycosides include rebaudioside M in an amount of at least about 95% by weight of the steviol glycosides.

6. The liquid concentrate composition of claim 1, wherein the liquid concentrate composition is a stable suspension at a temperature of less than about 45° C.

7. The liquid concentrate composition of claim 1, wherein the stabiliser is present in the liquid concentrate composition in an amount of from about 0.01 to about 2.0% by total weight of the liquid concentrate composition.

8. The liquid concentrate composition of claim 1, wherein the xanthan is present in the liquid concentrate composition in an amount of from about 0.01 to 1.0% by total weight of the liquid concentrate composition.

9. The liquid concentrate composition of claim 1, wherein the iota-carrageenan is present in the liquid concentrate composition in an amount of from about 0.05 to 1.0% by total weight of the liquid concentrate composition.

10. The liquid concentrate composition of claim 1, wherein the liquid concentrate composition comprises a food-compatible sequestering agent.

11. The liquid concentrate composition of claim 10, wherein the food-compatible sequestering agent is present in the liquid concentrate composition in an amount of from about 0.01% to about 2.0% by total weight of the liquid concentrate composition.

12. The liquid concentrate composition of claim 10, wherein the food-compatible sequestering agent is selected from the group consisting of trisodium citrate, sodiumhexametaphosphate, sodium acid pyrophosphate, trisodium phosphate, tetrasodium, pyrophosphate, sodium tripolyphosphate, disodium phosphate, ethylenediamine tetraacetic acid disodium salt, including corresponding conjugate acids, potassium salts, and mixtures thereof.

13. The liquid concentrate composition of claim 11, wherein the food-compatible sequestering agent comprises trisodium citrate.

14. The liquid concentrate composition of claim 1, wherein the liquid concentrate composition comprises a food-compatible acid selected from the group consisting of citric acid, phosphoric acid, malic acid, ascorbic acid, benzoic acid, lactic acid, fumaric acid, adipic acid, tartaric acid, gluconic acid, succinic acid, maleic acid, cinnamic acid, glutaric acid, or carbonic acid, and mixtures thereof.

15. The liquid concentrate composition of claim 14, wherein the food-compatible acid is present in the liquid concentrate composition in an amount of from about 0.01 to about 2.5% by total weight of the liquid concentrate composition.

16. The liquid concentrate composition of claim 15, wherein the food-compatible acid comprises citric acid.

17. The liquid concentrate composition of claim 1, wherein the liquid concentrate composition has a viscosity of about 1 mPa's or greater.

18. The liquid concentrate composition of claim 1, wherein the liquid concentrate composition has a global Turbiscan Stability Index of about 5 or less, after standing for 17 hours.

19. The liquid concentrate composition of claim 1, wherein the liquid concentration composition has a global Turbiscan Stability Index of about 15 or less, after standing for 72 hours.

* * * * *